(12) United States Patent
Tomita

(10) Patent No.: US 6,975,416 B2
(45) Date of Patent: Dec. 13, 2005

(54) PRINT CONTROL APPARATUS AND METHOD

(75) Inventor: Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 09/877,093

(22) Filed: Jun. 11, 2001

(65) Prior Publication Data

US 2002/0051166 A1    May 2, 2002

(30) Foreign Application Priority Data

Jun. 13, 2000    (JP) .............................. 2000-177450

(51) Int. Cl.[7] .............................................. G06F 15/00
(52) U.S. Cl. ................... 358/1.13; 358/1.15; 358/1.14
(58) Field of Search .............................. 358/1.15, 1.14, 358/1.13, 1.12, 442, 296; 700/90

(56) References Cited

U.S. PATENT DOCUMENTS

| | | | | |
|---|---|---|---|---|
| 5,971,582 A | * | 10/1999 | Fuji ............................ | 700/90 |
| 6,301,013 B1 | * | 10/2001 | Momose et al. ........... | 358/1.15 |
| 6,512,599 B1 | * | 1/2003 | Hattori ........................ | 358/442 |
| 6,590,671 B1 | * | 7/2003 | Kinjo ......................... | 358/1.12 |
| 6,614,546 B1 | * | 9/2003 | Kurozasa ................... | 358/1.15 |
| 6,639,688 B2 | * | 10/2003 | Imai ........................... | 358/1.14 |
| 6,819,439 B2 | * | 11/2004 | Hayashi et al. ............ | 358/1.13 |
| 2001/0012124 A1 | * | 8/2001 | Morikawa ................... | 358/296 |

FOREIGN PATENT DOCUMENTS

JP    11-129583    5/1999    ............ B41J 29/38

* cited by examiner

Primary Examiner—Kimberly Williams
Assistant Examiner—Satwant Singh
(74) Attorney, Agent, or Firm—Fitzpatrick, Cella, Harper & Scinto

(57) ABSTRACT

An object of this invention is to achieve high-speed automatic setting of a print mode. In a print control apparatus according to this invention, when a print mode set via a user interface window prior to the start of printing is an automatic mode, a print mode which satisfies print conditions is decided. If no print mode is decided at this stage, printing starts, and then a spooler (302) spools print information and determination information for deciding a print mode when the print mode is the automatic mode. When the print mode is an image mode or the image mode is determined to be preferable by determination information, a despooler (305) causes a renderer (306) to generate image data. When the print mode is a PDL mode or the PDL mode is determined to be preferable by determination information, the despooler (305) causes a printer driver to generate a PDL command. In any case, no print mode is decided from determination information as far as the print mode has already been decided as the image or PDL mode.

34 Claims, 17 Drawing Sheets

BEHAVIOR OF DRIVER IN ARRANGEMENT OF FIG.2

BEHAVIOR OF DRIVER IN ARRANGEMENT OF FIG.3

手ブレ補正機構を搭載し、最高レベルの画質を再現した、
新世代の超望遠Lレンズ

1. 新規光学設計による超高画質
   第2・第3レンズにUDガラスを、第5レンズに蛍石を
   採用することにより、望遠レンズで発生しがちな
   画質低下の要因である二次スペクトルを極小に抑え、
   高解像・高コントラストな画質を実現しています。

600dpi
8BITS EACH FOR
R, G, AND B COLORS
IMAGE DATA

| SETTING ITEM | AUTOMATIC SELECTION MODE | CPDL PDL MODE | Raster IMAGE MODE |
|---|---|---|---|
| Mode Details |  |  | ○ |
| Gradation | ○ | ○ | ○ |
| Color Halftones | ○ | ○ | ○ |
| Gray Compensation | ○ | ○ | ○ |
| ⋮ | ⋮ | ⋮ | ⋮ |
| ⋮ | ⋮ | ⋮ | ⋮ |
| ⋮ | ⋮ | ⋮ | ⋮ |

FIG. 10

COLLECTION OF DETERMINATION INFORMATION

| | | | |
|---|---|---|---|
| PRINT DATE & TIME | | | 1001 |
| PRINTER USER | | | |
| FILE NAME | | | |
| FILE UPDATE DATE | | | |
| APPLICATION NAME | | | |
| APPLICATION VERSION | | | |
| DRIVER OPERATION STATE | | | |
| TOTAL NUMBER OF PAGES | | | |
| FIRST PAGE | TEXT | NUMBER OF OBJECTS | 1002 |
| | | MAXIMUM POINT SIZE | |
| | GRAPHICS | NUMBER OF OBJECTS | |
| | | ROP | |
| | IMAGE | RESOLUTION, TONE LEVEL | |
| | | DATA SIZE | |
| | | ROP | |
| SECOND PAGE | TEXT | NUMBER OF OBJECTS | |
| | | MAXIMUM POINT SIZE | |
| | GRAPHICS | NUMBER OF OBJECTS | |
| | | ROP | |
| | IMAGE | RESOLUTION, TONE LEVEL | |
| | | DATA SIZE | |
| | | ROP | |

FIG. 17

| DETERMINATION ITEM | CPDL(PDL) | Raster(IMAGE) |
|---|:---:|:---:|
| Mode Details (High Speed) | | ○ |
| Mode Details (High Quality) | | ○ |
| Overlay Print | ○ | |
| Color Half Tones (Error Diffusion) | | ○ |
| ⋮ | ⋮ | ⋮ |
| ⋮ | ⋮ | ⋮ |
| ⋮ | ⋮ | ⋮ |

PRINT CONTROL APPARATUS AND METHOD

FIELD OF THE INVENTION

The present invention relates to a print control apparatus and method for generating print data in correspondence with, e.g., a drawing command from an application.

BACKGROUND OF THE INVENTION

In a conventional print processing system including a printer capable of designating a plurality of print conditions, e.g., print conditions such as color tone and resolution, these print conditions are fixed or explicitly designated by the user. Edit print setting of printing data of two pages on one page at once, or adding a date or predetermined frame to an image and printing them is also explicitly designated by the user.

As a print processing system of causing a printer having a plurality of print modes, e.g., PDL (Page Description Language) mode and image mode to print data, there is proposed a system having an automatic print mode selection function of automatically selecting a print mode used for printing in print processing (specifically, processing by a printer driver) (Japanese Patent Laid-Open No. 11-129583). In the PDL mode, a host converts application data into PDL data containing a command in a format interpretable by a printer and transmits the PDL data to the printer. In the image mode, the host converts application data into bitmap data and transmits the bitmap data to the printer.

To decide print conditions, the print processing system having this automatic print mode selection function checks print contents to analyze the type of document to be printed, and automatically sets a print mode based on the analysis result.

This system analyzes print contents and determines a print mode even when a print mode which should be set in automatic setting due to print conditions explicitly designated by the user. As a result, the time taken to decide a print mode becomes long, and the total print time also becomes long because of the time for analyzing print contents and deciding a print mode.

As for a processing print function which cannot be executed in a given print mode as an automatic setting choice, the user cannot select a print mode for realizing this function when a print mode is automatically selected. In this case, no choice is displayed for the user.

SUMMARY OF THE INVENTION

The present invention has been made in consideration of the above situation, and has as its object to provide a print control apparatus and method capable of automatically setting a print mode within a short time, and in automatic setting, preferentially selecting a print mode which satisfies a function and condition designated by the user and performing print processing in the print mode.

To achieve the above object, the present invention has the following arrangement.

According to the present invention, the foregoing object is attained by providing a print control apparatus for generating print data for a print device having a plurality of print modes, comprising: user interface means for causing a user to set a print setting item; first decision means for deciding one of the plurality of print modes in accordance with an item set via the user interface means; and generation means for generating print data to be printed by the print device in the print mode decided by the first decision means.

In a preferred embodiment, The apparatus further comprises transmission means for transmitting the print data generated by the generation means to the print device.

In a preferred embodiment, the apparatus further comprises second decision means for, when the first decision means does not decide one print mode, deciding a print mode in accordance with contents of print data to be printed, and when the second decision means decides the print mode, the transmission means transmits the print data to the print device in the print mode.

In a preferred embodiment, prior to decision of a print mode by the first and second decision means, the user interface means causes the user to select one of the plurality of print modes or an automatic mode in which one of the plurality of print modes is automatically decided, and the first and second decision means decide one print mode when the automatic mode is selected.

In a preferred embodiment, the item set via the user interface means includes an adjustment item for adjusting quality of an image to be printed.

In a preferred embodiment, the item set via the user interface means includes an edit item for editing an image to be printed.

In a preferred embodiment, the plurality of print modes include an image mode in which the print device receives and prints image data, and when the adjustment item is set via the user interface means, the first decision means decides the image mode as a print mode.

In a preferred embodiment, the plurality of print modes include a PDL mode in which the print device receives a page description instruction, generates an image, and prints the image, and when the edit item is set via the user interface means, the first decision means decides the PDL mode as a print mode.

In a preferred embodiment, the second decision means calculates data amounts of print data to be transmitted to the print device in the respective image and PDL modes, and decides a mode exhibiting a small data amount as a print mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing the display items of a user interface according to the present invention;

FIG. 10 is a view showing an example of determination information to be collected in the embodiment;

FIG. 17 is a table showing the determination item and operation mode of a user interface according to the embodiment.

DETAILED DESCRIPTION OF THE PREFERRED EMBODIMENT

An embodiment to which the present invention can be preferably applied will be described.

Figure 1:
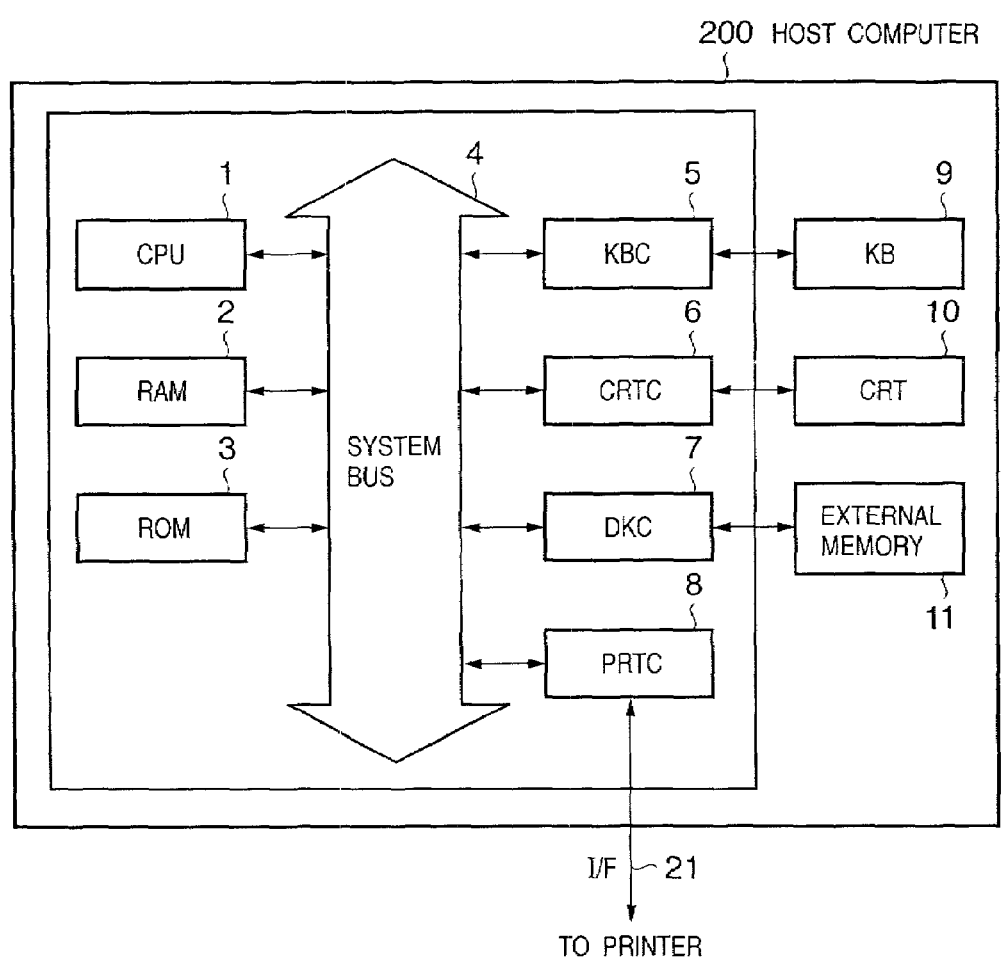
FIG. 1 is a block diagram showing the basic arrangement of a host computer to which a print data processing apparatus according to an embodiment of the present invention can be applied.

FIG. 1 is a block diagram for explaining the arrangement of a host computer including a print data processing apparatus to which the embodiment of the present invention can be applied. In FIG. 1, a CPU 1 processes a document containing graphics, images, characters, tables (including a spreadsheet), and the like on the basis of a document processing program or the like stored in the program area of a ROM 3 or an external memory 11. The CPU 1 integrally controls devices connected to a system bus 4.

The ROM 3 or external memory 11 stores an operating system (to be referred to as an OS hereinafter) serving as a control program for the CPU 1, font data used to process a document, and various other data. A RAM 2 functions as, e.g., the main memory and work area of the CPU 1. A keyboard controller (KBC) 5 controls an input from a keyboard (KB) 9 or a pointing device such as a mouse (not shown). A CRT controller (CRTC) 6 controls display of a CRT display 10. The external memory 11 is a hard disk (HD), floppy disk (FD), or the like, and stores a boot program, various applications, font data, user files, edit files, print data generation processing program (to be referred to as a printer driver hereinafter), and the like. A disk controller (DKC) 7 controls access to the external memory 11 from the CPU 1 or the like. A printer controller (PRTC) 8 is connected to a printer 100 via a predetermined bidirectional interface (interface) 21, and executes communication control processing. The CPU 1 executes, e.g., rasterizing processing of an outline font to a display information RAM set in the RAM 2, and enables WYSIWYG on the CRT 10. Further, the CPU 1 opens various registered windows on the basis of commands designated with a mouse cursor (not shown) on the CRT display 10, and executes various data processes. In executing printing, the user designates a window (user interface) to be opened that is provided by a printer driver and concerns print setting, sets a printer on the window, and also sets a print processing method including selection of a print mode for the printer driver.

Figure 2:
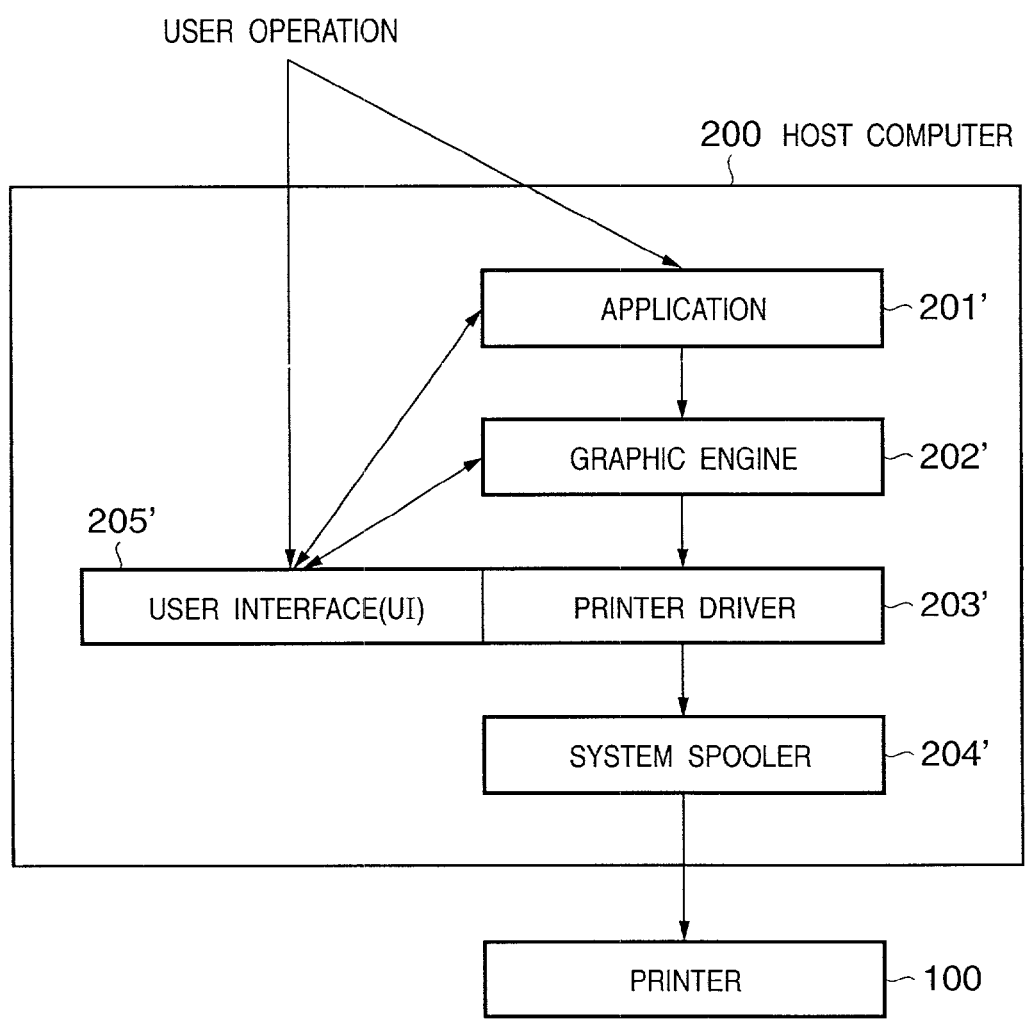
FIG. 2 is a block diagram for explaining the flow of print data in the print data processing apparatus.
Figure 3:
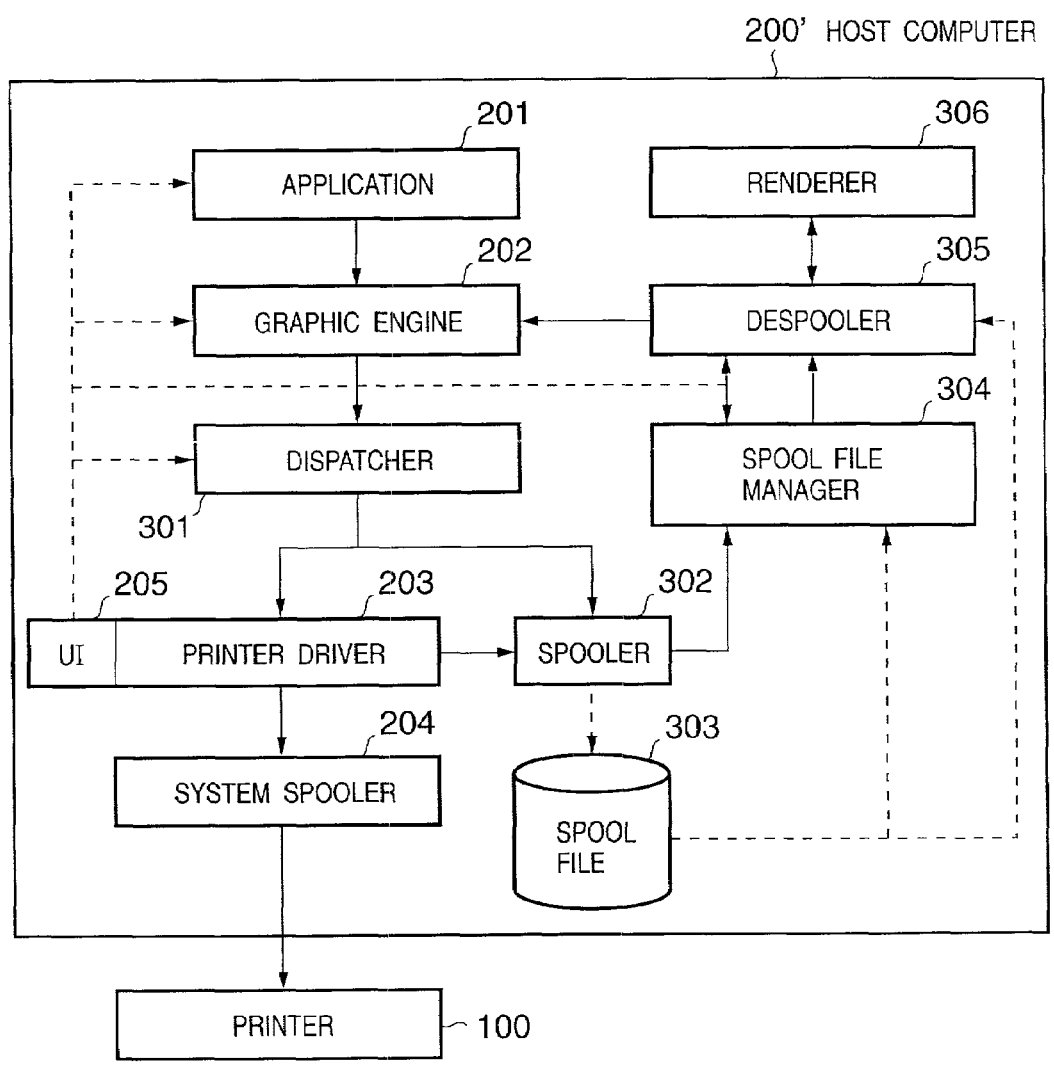
FIG. 3 is a block diagram for explaining the flow of print data in the print data processing apparatus.

FIGS. 2 and 3 are block diagrams for-explaining the flow of print data in the arrangement of the print data processing apparatus shown in FIG. 1. FIGS. 2 and 3 show general print data generation processing in a host computer or dedicated print server connected to a print device such as a printer directly or via a network.

In FIG. 2, an application 201', graphic engine 202', printer driver 203', and system spooler 204' are program modules which exist as files saved in the external memory 11 such as a CD-ROM or hard disk, and are loaded to the RAM 2 and executed by an OS or a module using these modules.

The application 201' and printer driver 203' can be added to an FD, a CD-ROM, or the external memory 11 such as a hard disk via a network (not shown). The application 201' saved in the external memory 11 is loaded to the RAM 2 and executed. In printing data from the application 201' by the printer 100, the data is output (drawn) by using the graphic engine 202' which has been loaded to the RAM 2 and is in an executable state.

The graphic engine 202' similarly loads the printer driver 203' prepared for each print device from the external memory to the RAM 2, and converts an output from the application 201' into a printer control command by using the printer driver 203'. The converted printer control command passes through the system spooler 204' loaded to the RAM 2 by the OS, and is output to the printer 100 via the interface 21.

A print data processing apparatus shown in FIG. 3 is extended from the print data processing apparatus shown in FIG. 2. The apparatus of FIG. 3 temporarily generates a spool file 303 made up of intermediate codes when transmitting a print instruction from a graphic engine 202 to a printer driver 203.

Figure 4A:
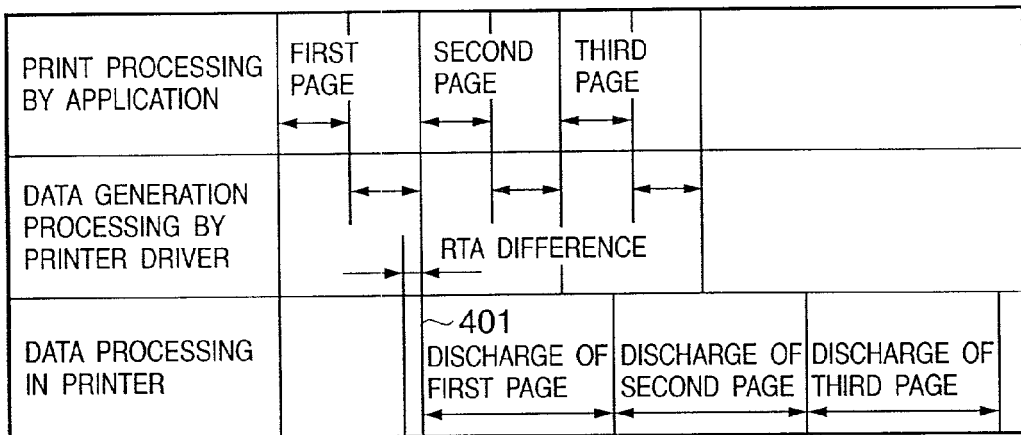
FIGS. 4A and 4B are schematic views showing time-series comparison between the behavior of a driver in the arrangement of FIG. 2 and that of a driver in the arrangement of FIG. 3.
Figure 4B:
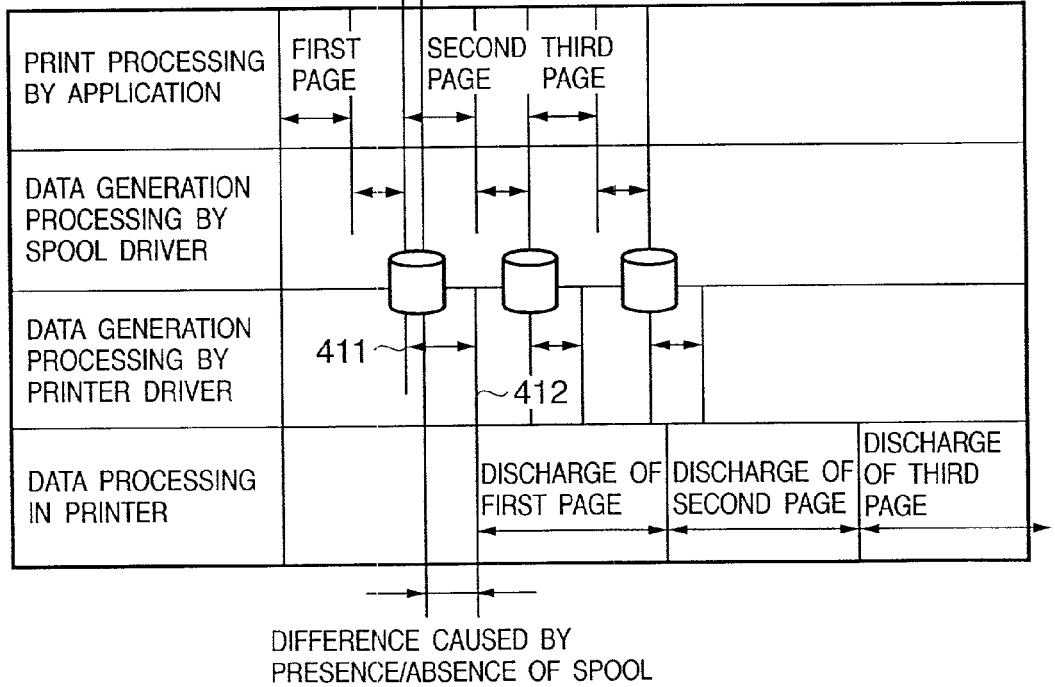

More specifically, in the print data processing apparatus shown in FIG. 2, the application 201' is released from print processing after the printer driver 203' converts all print instructions from the graphic engine 202' into printer control commands. In the print data processing apparatus shown in FIG. 3, an application 201 is released from print processing after a spooler 302 converts all print instructions into intermediate code data and outputs them to the spool file 303. In general, the time up to release of an application (RTA: Return To Application) is shorter in the latter case. However, the time up to the completion of output of a print result from a print device is longer in the latter case by a spool file generation time. These relationships are shown in FIG. 4. In FIG. 4, the behavior of a driver in the arrangement of FIG. 2 and that of a driver in the arrangement of FIG. 3 are schematically compared in time series.

In FIG. 4, the application 201' of FIG. 2 is released from print processing at a timing 401, and the application 201 of FIG. 3 is released from print processing at a timing 411. The difference between these timings is an RTA difference. The end timing of generating print data to be transferred to the print device is the timing 401 in the system of FIG. 2, and in the system of FIG. 3, is timing 412 at which the printer driver 203 completes data generation. The difference between the timings 401 and 412 is a difference in timing of starting printing the first page. If the two systems use the same printer engine, the timing difference directly becomes an output completion timing difference because the time taken for recording operation is equal between the two systems.

The print data processing apparatus shown in FIG. 3 can analyze drawing information within a page and process data of a generated spool file 303 during generation of an intermediate code to be stored in the spool file 303. This print data processing apparatus enables automatically selecting an optimal operation mode for print data sent from the application 201 in accordance with function setting performed on a user interface 205. Furthermore, the print data processing apparatus can realize an additional print function not provided to a general application, such as scaling or N-up printing of reducing a plurality of pages into one page and printing it.

For this purpose, the system of the print data processing apparatus shown in FIG. 2 is so extended as to spool data by intermediate code data, like the print data processing apparatus shown in FIG. 3. To automatically select an optimal operation mode or process print data, the user performs setting on the window of the user interface 205 provided by the general printer driver 203, the printer driver 203 saves the setting contents in the RAM 2 or external memory 11, and a spool file manager 304 or despooler 305 refers to the values to realize selection of an operation mode or data processing.

The arrangement of FIG. 3 will be explained in more detail.

In the print cata processing apparatus shown in FIG. 3, a dispatcher 301 receives a print instruction from the graphic engine 202. When the print instruction received by the dispatcher 301 from the graphic engine 202 is a print instruction issued from the application 201 to the graphic engine 202, the dispatcher 301 loads the spooler 302 stored in the external memory 11 to the RAM, and sends the print instruction not to the printer driver 203 but to the spooler 302. The spooler 302 converts the received print instruction (print data) into an intermediate code and outputs the intermediate code to the spool file 303. The spool file 303 is made up of not one file but several files. In converting the print instruction into an intermediate code, the spooler 302 analyzes the converted intermediate code to obtain information such as the type of print instruction, a method of processing the print instruction on the printer side, and the load of this processing. This analysis processing is done for automatic selection of an optimal operation mode. The spooler 302 saves the analysis processing result as another file in the spool file 303. The spooler 302 acquires from the printer driver 203 processing setting information concerning print data set for the printer driver 203, and saves the information in the spool file 303. Note that the spool file 303 is generated as a file in the external memory 11, but can be generated in the RAM 2. The spooler 302 loads the spool file manager 304 stored in the external memory 11 to the RAM 2, and notifies the spool file manager 304 of the generation status of the spool file 303. When the spool file manager 304 determines that printing is possible by using the graphic engine 202 again, in accordance with the contents of the processing setting information concerning print data that is saved in the spool file 303, the spool file manager 304 loads the despooler 305 stored in the external memory 11 to the RAM 2, and instructs the despoiler 305 to execute print processing of the intermediate code described in the spool file 303.

The despooler 305 processes the intermediate code included in the spool file 303 in accordance with information of the print instruction analysis result included in the spool file 303 and the contents of the processing setting information, and maps the intermediate code into a print image at a high speed by a renderer 306 included in the despooler 305 in accordance with the print mode (to be described later) or the like. Whether to map the intermediate code into a print image is comprehensively determined based on information such as the set edit setting information, and the result file of analysis processing performed by the spooler 302 that is read out by an optimization determination processor included in the despooler 305. This determination may be done for each page or each drawing object. In any case, the despooler 305 reads out an intermediate code from the spool file 303, converts it into a form conforming to the API (Application Programming Interface) of the graphic engine 202, and outputs the converted data via the graphic engine 202.

When the print instruction received by the dispatcher 301 from the graphic engine 202 is a print instruction issued from the despooler 305 to the graphic engine 202, the dispatcher 301 switches processing not to the spooler 302 but to the printer driver 203. The printer driver 203 generates a printer control command and outputs it to the printer 100 via the system spooler 204.

Figure 5:
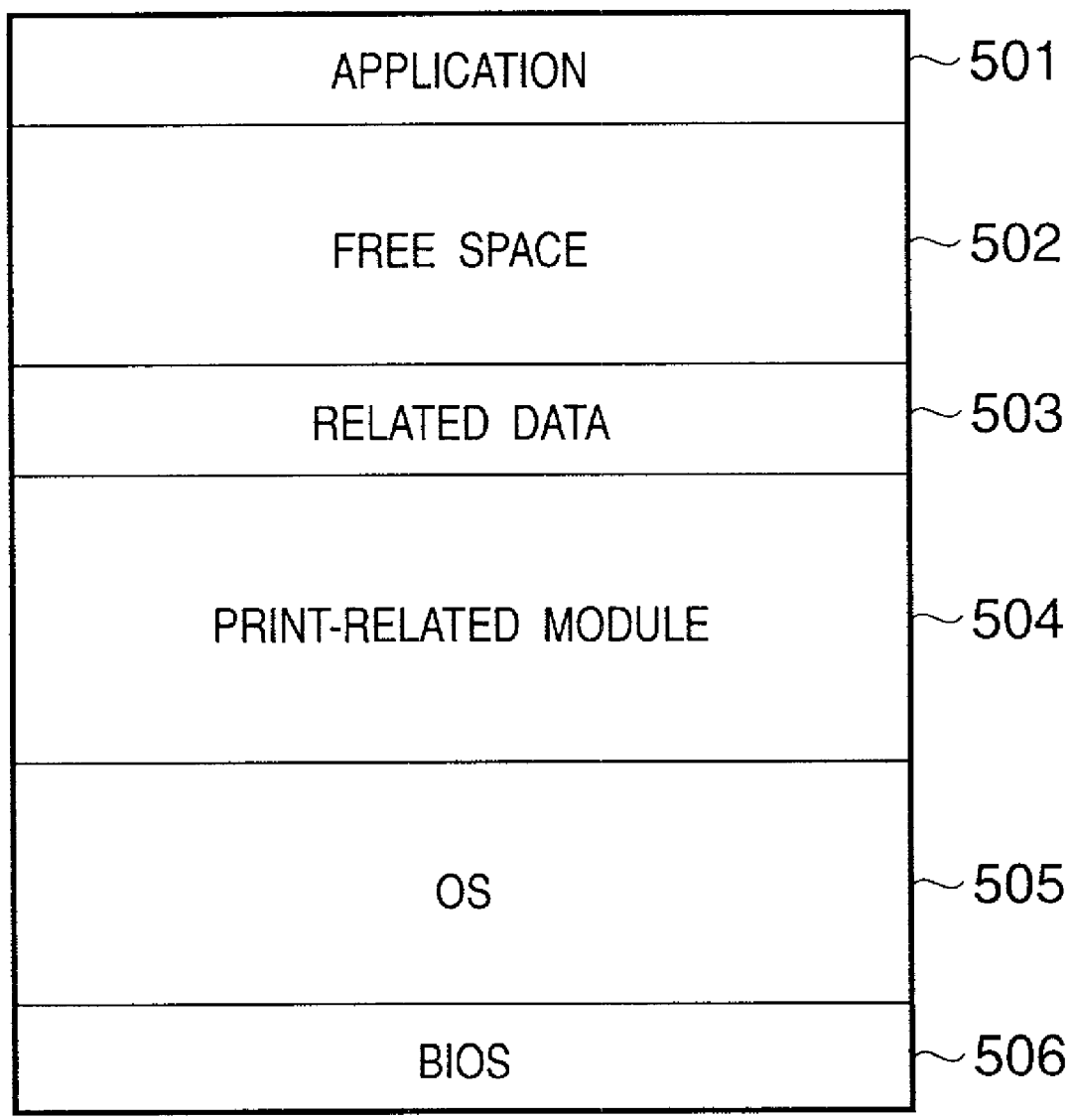
FIG. 5 is a view showing an example of the memory map of a RAM in the host computer shown in FIG. 1.

FIG. 5 is a view showing an example of the memory map of the RAM 2 in a host computer 200 shown in FIG. 1. FIG. 5 shows a memory map in which a print-related module 504 including a series of print data generation processing programs in this embodiment, an application 501, related data 503, an OS 505, and a BIOS 506 are loaded to the RAM 2 in the host computer 200 and become executable. Reference numeral 502 denotes a free space.

<Decision Processing Based on Setting Items of Print Mode>

Automatic selection processing of an optimal operation mode will be explained. The following automatic selection processing of an operation mode is implemented by the print processing system in FIG. 3.

In print processing by application software, intermediate print information (intermediate data) independent of a specific PDL is generated from a print instruction and temporarily stored in the spool file 303. The stored intermediate data is analyzed, and an optimal operation mode is automatically decided from the result. As print modes, this embodiment adopts an image mode in which the host performs up to rendering processing of a print image, and a PDL mode in which the print device renders a print image by using a PDL (Printer Description Language) installed in the print device. This printer driver executes automatic selection processing of an optimal operation mode as follows.

Figure 6:
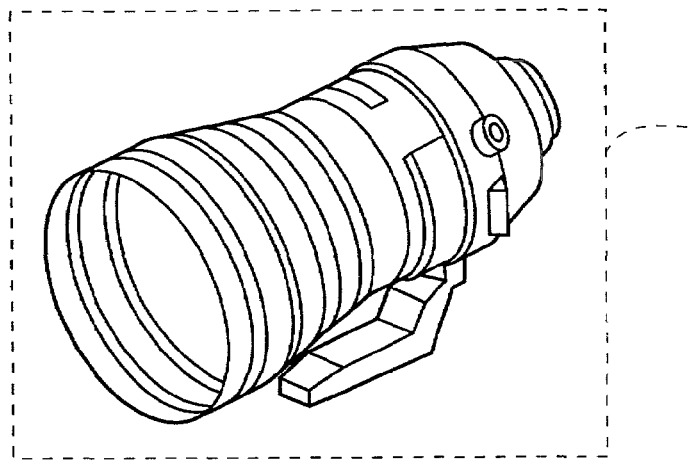
FIG. 6 is a view showing an example of a print sample susceptible to an operation mode setting error.

Printing of a photograph-containing document by a color LBP will be exemplified. A photographic portion (within the broken line) in FIG. 6 has image data with very high resolution and high tone level. More specifically, this image is an image of 600 dpi and 8 bits for R, G, and B colors each at an equal magnification. The remaining portion has characters. A document as shown in FIG. 6 looks simple at a glance and is considered to be preferably processed in the PDL mode. However, if this image data is converted into a PDL command, image information of an image quality exceeding an image quality printable by a printer, i.e., image information having redundant information is sent from the printer driver to the printer. For this reason, such a document can be processed at a higher speed in the image mode. Which of the print modes is better can be determined by obtaining the image data amount sent to the printer in advance.

The spooler of FIG. 3 described in this embodiment generates intermediate data independent of a specific PDL in print processing by application software. At this time, the spooler also spools, from the intermediate data including image data, determination information for predicting two values, i.e., a data amount required when the image data is converted into a PDL command and a data amount required when the image data is mapped by the renderer of the host into a print image in accordance with the output resolution and output tone level of the printer. The despooler 305 predicts and compares two sizes after mapping on the basis of the determination information. The print image is drawn in the print mode exhibiting a smaller value, allowing high-speed print processing. Hence, in processing print data including a high-quality image as shown in FIG. 6, the printer driver of this embodiment automatically selects the image mode in which the host maps an image as an optimal operation mode.

Automatic selection processing of an optimal operation mode is done in this manner. Automatic selection processing is different from print processing and requires its own time other than the print time. A function which cannot be set in either operation mode must be set not to select the function setting in automatic selection processing.

For this reason, this embodiment causes the user to designate a print processing method including whether to automatically determine a print mode on a UI (User Interface) for designating a print mode and print conditions. This can shorten the print time for a setting when an operation mode need not be automatically set. Also for a setting which cannot be satisfied in either operation mode, a message to this effect can be displayed on the UI. Proper print processing can be provided without degrading performance or performing cumbersome user operation.

The user interface 205 and print mode decision processing implemented by the print system of the embodiment will be described with reference to FIG. 7. The printer driver 203 provides the user interface 205 for performing print setting in accordance with a request from the user or an application. If user interface display processing starts via an OS (Operating System), the printer driver 203 determines whether print setting set via the current user interface 205 is an "automatic selection mode" (S701). The automatic selection mode is for automatically determining and deciding a print mode. When the automatic selection mode is set, actual print processing is done in either of the PDL and image modes.

In accordance with the determination result in step S701 and a table (FIG. 8) which describes print conditions settable in each mode, the printer driver 203 provides the user interface 205 for causing the user to set print conditions, and displays the user interface 205 via the OS (S702, S706). In FIG. 8, an item settable by the user in a selected print mode is checked with a circle. For example, if the automatic selection mode or PDL mode is selected, the item "Mode Details" is not displayed as a choice.

The printer driver 203 causes the user to set necessary items in steps S703 and S707. In the automatic selection mode, the printer driver 203 decides a print processing method on the basis of the print setting set via the user interface 205 (S704). Then, the printer driver 203 notifies the dispatcher 301 of the decided choice or a choice selected by the user (S705). At this time, the display on the UI is kept unchanged. Note that the notified choice includes a print mode such as the PDL mode, image mode, or automatic selection mode. The print processing method is decided in step S704 by the printer driver 203 on the basis of only the print setting set via the user interface 205. In this stage, the print mode may or may not be decided to the PDL or image mode. If the print mode cannot be decided, it keeps the automatic selection mode, and is decided by analyzing intermediate data in spooler processing, as will be described later with reference to FIG. 13.

Details of processing in determination step S704 will be described with reference to FIGS. 16 and 17. The table of FIG. 17 shows a print condition including a user-settable item and value, and a print mode which satisfies the condition. For example, when the value of the item "Mode Details" is set to "High Speed" or "High Quality", the print mode which satisfies this condition is the image mode "Raster", as shown in FIG. 17. When the item "Overlay Print" is set, the print mode must be the PDL mode. In this fashion, a setting item and set value which restrict a print mode, and a print mode corresponding to the setting are prepared in advance as a table. The setting items registered in the table of FIG. 17 will be called determination items because these items are determination targets in the procedures of FIG. 16. In this embodiment, the table of FIG. 17 is created to select the image mode when adjustment of the quality of an image to be printed is designated, and the PDL mode when editing of an image is designated.

Figure 7:
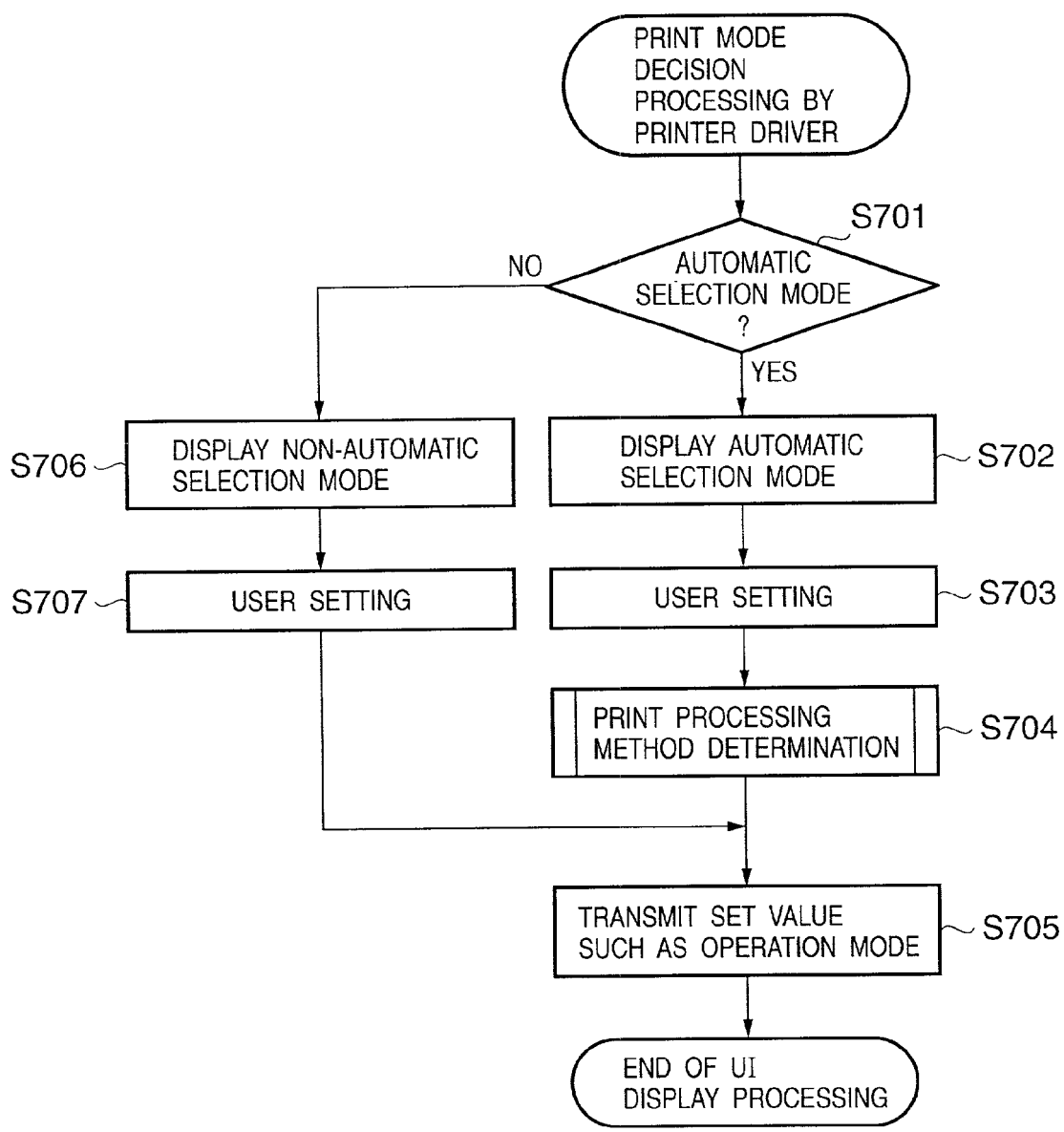
FIG. 7 is a flow chart showing an example of print data processing procedures in a print control apparatus according to the present invention.
Figure 16:
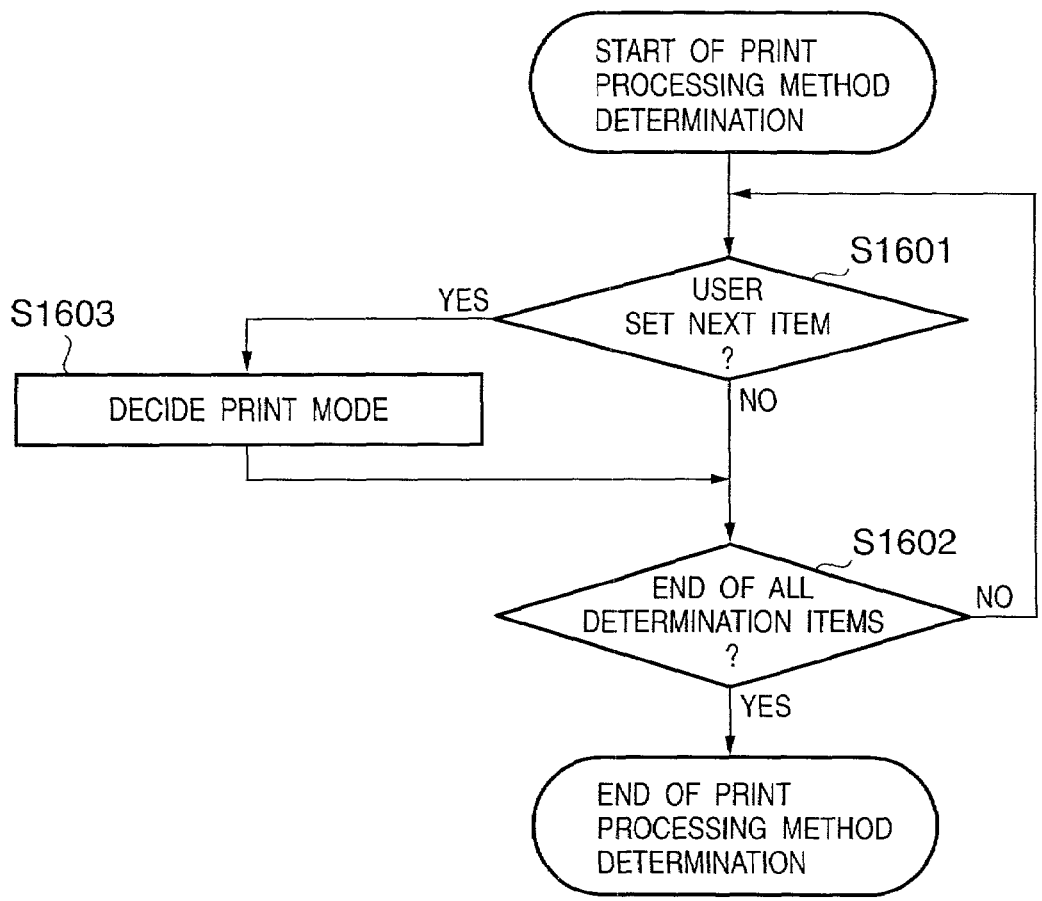
FIG. 16 is a flow chart showing an example of print data processing procedures in the print control apparatus according to the present invention.

FIG. 16 is a flow chart for explaining in detail print processing method determination processing in step S704 of FIG. 7 described above. This processing is implemented by the printer driver 203. The printer driver 203 sequentially reads items (choices) set by the user on the user interface 205, and determines whether the first determination item is set by the user (S1601). If NO in step S1601, the user interface 205 checks whether all determination items have been determined (S1602). If NO in step S1602, the user interface 205 reads the next item and sequentially executes determination processing. If YES in step S1601, the printer driver 203 determines a print mode in accordance with the table (FIG. 17) (S1603). Determination is repeated until whether the user sets the next determination item is checked for all the items of the table (FIG. 17). If no print mode is set, or a plurality of different print modes (PDL and image modes) are determined to be suitable for printing, the print mode keeps the "automatic selection mode", and print processing method determination ends, in order to execute determination processing in spool processing (to be described later).

If one suitable print mode is decided, this print mode is newly set. If the print mode is set, the flow advances to print data generation processing by the printer driver 203 without executing determination processing in spool processing.

Since a print mode suitable for print setting on the user interface 205 provided by the printer driver 203 is easily decided, the processing speed can increase without performing automatic determination by spool processing. Accordingly, the throughput of print processing can increase.

Figure 9:
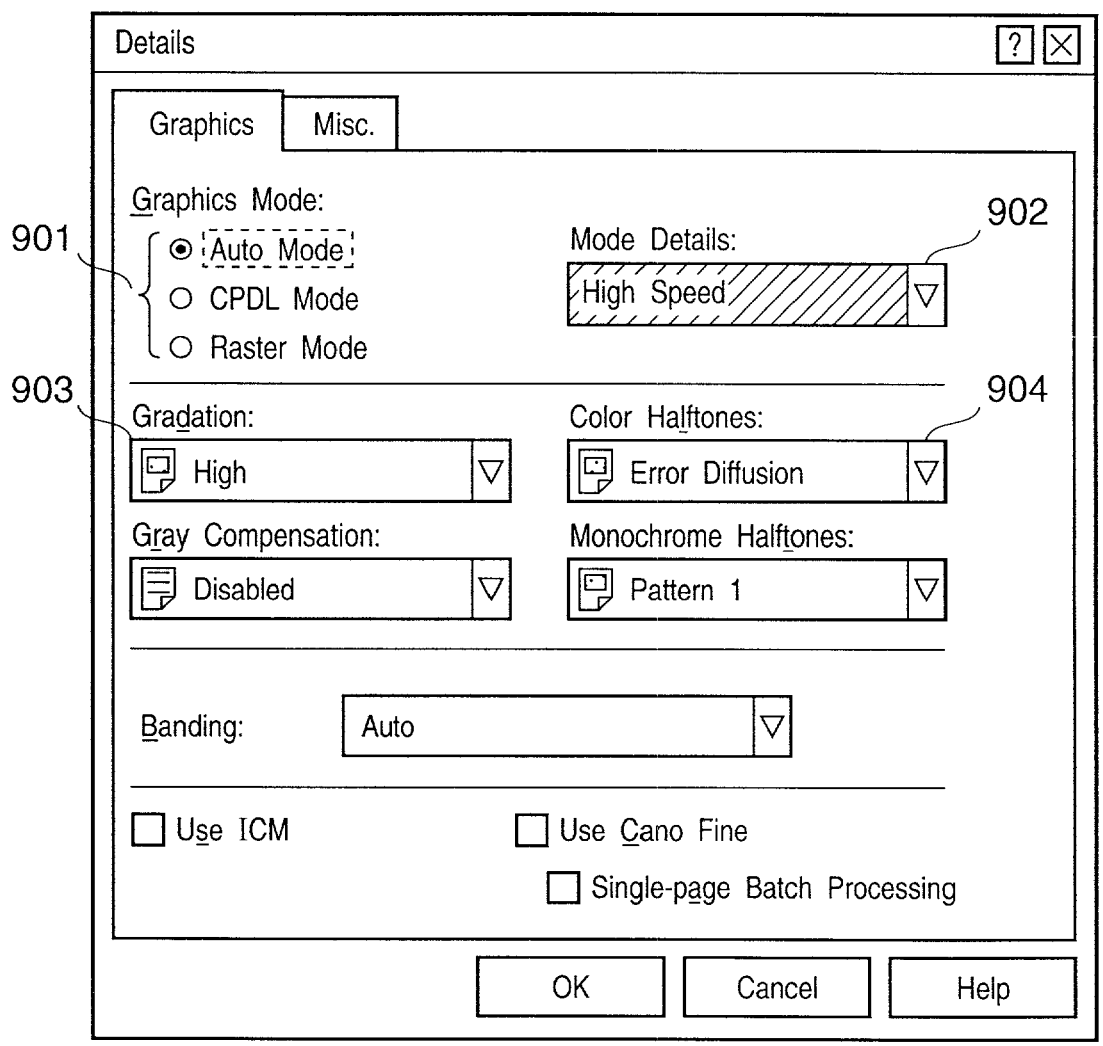
FIG. 9 is a view showing an example of a user interface window for a user inquiry according to the embodiment.

An example of the UI in this embodiment will be explained with reference to FIG. 9. Even when two print modes 901, CPDL (PDL mode) and Raster (image mode), are provided, an "AUTO" mode which means an automatic setting mode is provided, and the AUTO mode is set as an initial value. As for print conditions displayed at this time, an automatically set item is displayed in a state in which the user cannot select any value, as represented by a box 902, and an item explicitly settable by the user is displayed in a selectable state, as represented by a box 903.

A choice 904 which can be processed in only the Raster (image) mode is also displayed in a selectable state. If the user clicks "OK" in this state, step S704 of FIG. 7, i.e., the procedures of deciding a print processing method in FIG. 16 are executed because the print mode 901 is set to "Auto". In FIG. 9, the item "Color Halftone" is set to "Error Diffusion". When the item "Color Halftone" is set to "Error Diffusion", only the image mode "Raster" is selected as a print mode from the table of FIG. 17. Thus, the print mode is decided to the image mode. The dispatcher 301 is notified of this decision.

When no print mode is automatically decided, print mode decision processing in despool processing is performed, as will be described with reference to FIG. 13. When a print mode is decided in step S704 of FIG. 7, the dispatcher 301 causes the printer driver 203 to start processing in accordance with the print mode notified in step S705. That is, if the print mode is the automatic selection processing, the dispatcher 301 transfers a print instruction to the spooler 302 and causes the spooler 302 to perform spool processing. If the print operation mode is the "PDL mode" or "image mode", the dispatcher 301 transfers a print instruction to the printer driver 203 and causes the printer driver 203 to perform print data generation processing.

<Determination Information>

If an operation mode is automatically decided, i.e., if no print mode is decided in step S704 of FIG. 7 and the print mode notified in step S705 is the "automatic selection mode", the spooler 302 collects determination information described above. In generating intermediate data of each page, the spooler 302 collects determination information as shown in FIG. 10 that is necessary for deciding an optimal operation mode, and records the collected information together with the intermediate data. The determination information shown in FIG. 10 is roughly divided into general information 1001 concerning a print job and information 1002 concerning the drawing contents of each page. The former information records a print date and time, a printer user, the file name of a file to be printed, the creation date and update date of the file, the name and version of application software which executed printing, setting of the UI of a printer driver (driver operation state) in printing, the total number of pages of a print job, and the like. As for the information concerning the drawing contents of each page, data of each page are classified into three large drawing objects, i.e., text, graphics, and image, and pieces of information necessary for each object are collected. For example, for the text, the number of characters and the maximum point of a character size within the page are collected and recorded. For the graphics, the total number of graphic objects within the page and information representing whether logical drawing is designated in drawing (ROP) are collected. For the image, the resolution of an image to be drawn and the like are similarly collected.

The despooler 305 of FIG. 3 decides a print mode by determining the type of document for each page on the basis of these pieces of determination information recorded by the spooler 302. More specifically, as for text information, the despooler 305 compares the maximum point size of a character with a certain threshold, when the maximum point size is larger than the threshold, determines that rendering processing on the host side, i.e., the image mode is efficient, and when the maximum point size is smaller, determines that rendering processing on the printer side, i.e., the PDL mode is efficient. As for graphics, the despooler 305 compares the number of objects with a certain threshold, when the number of objects is larger than the threshold, determines that rendering processing on the host side, i.e., the image mode is efficient, and when the number of objects is smaller, determines that rendering processing on the printer side, i.e., the PDL mode is efficient. As for an image, the despooler 305 predicts a data amount to be transmitted to the printer as a PDL command on the basis of information such as the resolution, tone level, and drawing region, when the predicted value is larger than an image size obtained by rendering processing and halftoning processing on the host side, determines that rendering processing on the host side, i.e., the image mode is efficient, and when the predicted value is smaller, determines that rendering processing on the printer side, i.e., the PDL mode is efficient. Note that the printer used is assumed to be a binary printer. As for ROP, if an ROP number not supported by the printer is designated, the despooler 305 determines that rendering processing on the host side, i.e., the image mode should be done; otherwise, determines that rendering processing on the printer side, i.e., the PDL mode is efficient. A mode determined to be efficient is selected as a print mode.

<Print Mode Decision Processing Based on Determination Information>

A series of steps of generating and reading out intermediate data in the present invention will be described with reference to the flow chart of FIG. 11.

Figure 11:
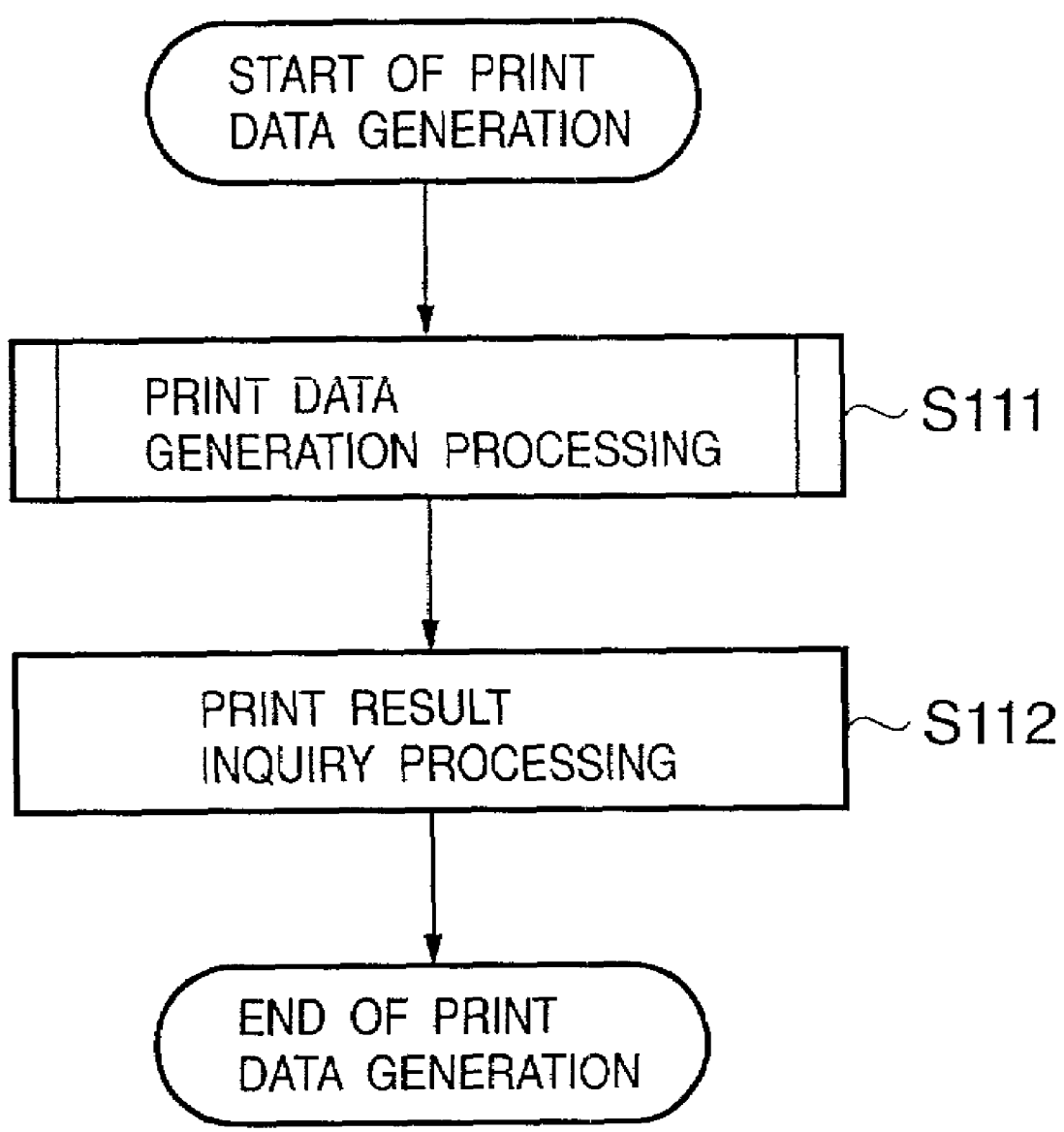
FIG. 11 is a flow chart showing an example of print data processing procedures in the print control apparatus according to the present invention.
Figure 12:
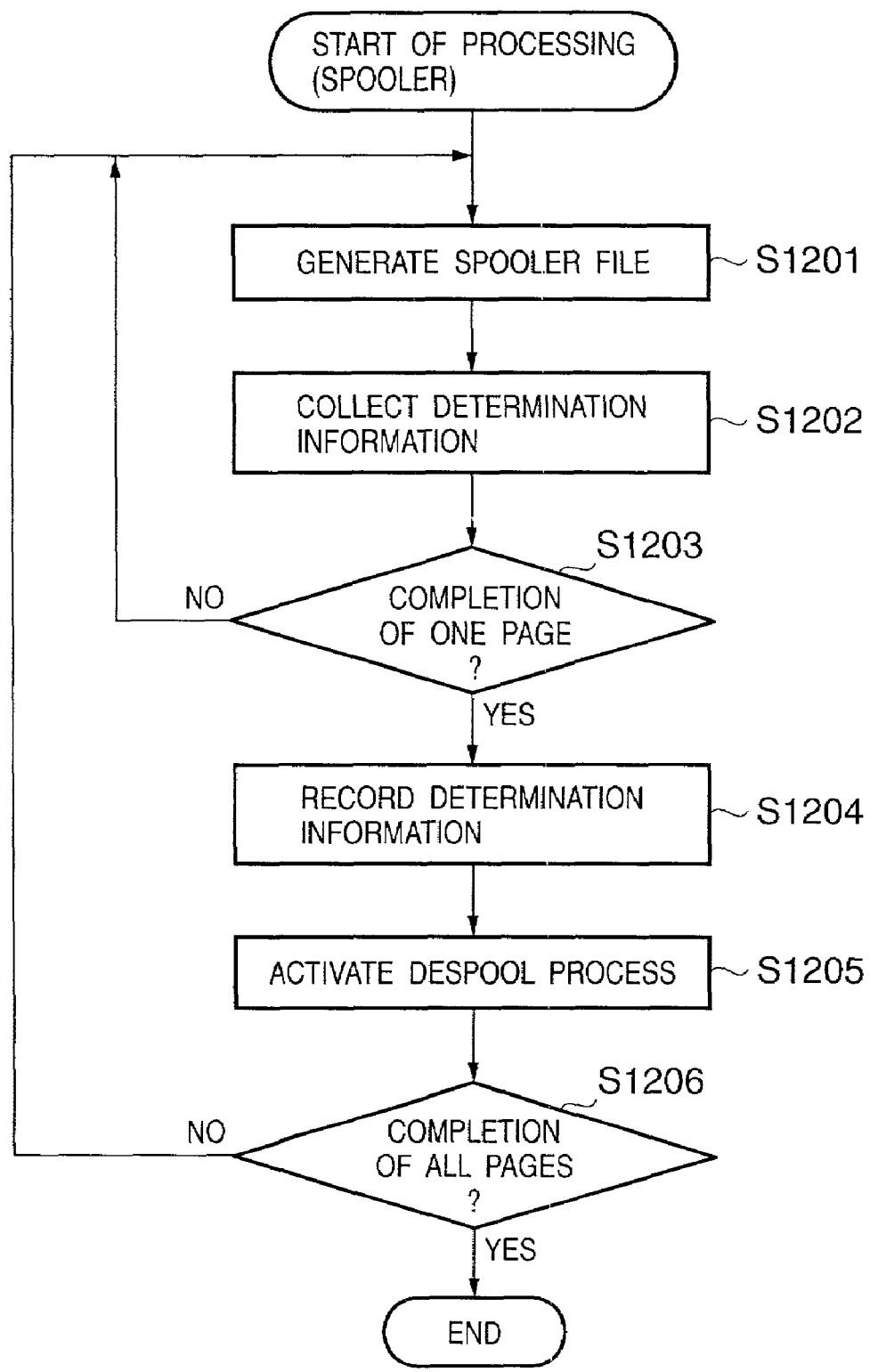
FIG. 12 is a flow chart showing the example of print data processing procedures in the print control apparatus according to the present invention.

In step S111 of FIG. 11, print data generation processing is performed. In step S112, the printer driver inquires a print result of the printer. FIGS. 12, 13, and 14 are flow charts for explaining step S111 of FIG. 11 as print processing in the arrangement of FIG. 3. The processing flow in FIG. 12 shows processing by the spooler in FIG. 3, the processing flow in FIG. 13 shows processing by the despooler in FIG. 3, and the processing flow in FIG. 14 shows processing by the printer driver in FIG. 3.

<Spool Processing>

In the flow chart of FIG. 12, various initialization operations are done at the start of processing, and print processing starts. The spooler receives print data from the graphic engine, and spools the contents as intermediate print information (print data) independent of a specific PDL (S1201). If the print mode is not decided yet and keeps "Auto", the spooler collects pieces of determination information shown in FIG. 10 (S1202). The spooler executes steps S1201 and S1202 for all data within the page (S1203). Upon the completion of processing of one page, the spooler spools as a file the pieces of determination information collected in step S1202 (S1204). The spooler has spooled information of one page, so that the despooler which operates as another process is activated (S1205). If the despooler has already been activated, no processing is done in step S1205. Since the despooler operates as another process in another time series, processing by the despooler will be explained with reference to FIG. 13. In step S1206, the spooler checks whether all pages have been processed. If NO in step S1206, the spooler repeats processing from step S1201 again; if YES, ends processing. If a print mode has already been decided by the procedures of FIG. 7, the spooler may spool the print mode in addition to the general information 1001 concerning a print job in step S1204. In this case, the despooler and printer driver perform processing in the print mode spooled at this time.

<Despool Processing and Rendering Processing>

The processing flow of the despooler will be described with reference to the flow chart of FIG. 13. Processing in FIG. 13 starts when the print mode is not decided in FIG. 7 and is "Auto". If the print mode is not "Auto", the printer driver generates print data in either the set "PDL mode" or "image mode".

Various initialization operations are done at the start of processing, and despool processing starts. The despooler reads out determination information of each page and decides a print mode (S1302). In the automatic selection mode, a decision in step S1302 is made by the method described in <Determination Information>. In a mode other than the automatic selection mode, the set mode is directly selected as a decided print mode.

In step S1303, the despooler determines the print mode in accordance with the result. The despooler shifts to step S1304 for a page or job in the PDL mode that should be processed on the printer side (PDL), and to step S1307 for a page or job in the image mode that should be processed on the host side.

In step S1304, the despooler opens a file including the spooled contents of drawing data and various drawing attributes, and reads out the contents from the start of the file. The despooler converts the spooled intermediate data into an API form provided by the graphic engine, and performs print processing again by using the function of the graphic engine (S1305). The despooler checks in step S1306 whether print information of one page has been reconstructed, and if necessary, repeats processing in steps S1304 and S1305. For a page determined to be rendered on the host side as a result of determination for each page, the despooler shifts to step S1307, opens a file including the spooled contents of drawing data and various drawing attributes, and reads out the contents from the start of the file. The despooler converts the spooled intermediate data into an API form provided by the renderer, and renders each print information so as to obtain a print image (S1308). The rendering result is an image. The despooler converts this image into an API form provided by the graphic engine, and performs print processing again by using the function of the graphic engine. In step S1310, the despooler checks whether information of one page has been processed. If YES in step S1310, the despooler checks in step S1311 whether all pages have been processed. If NO in step S1311, the despooler repeats processing from step S1303. Then, the despooler ends processing.

<Drawing Command Generation Processing>

Figure 13:
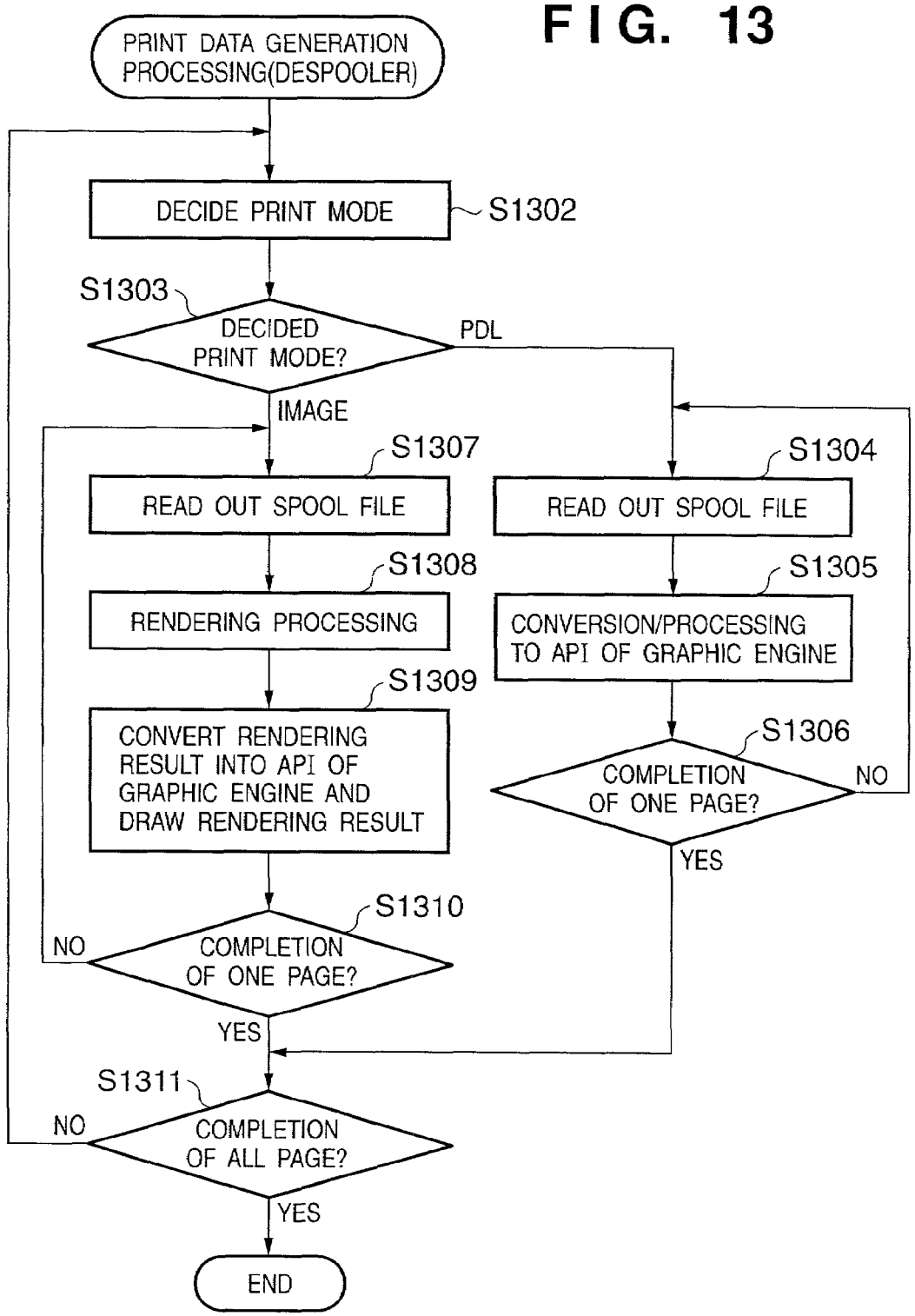
FIG. 13 is a flow chart showing the example of print data processing procedures in the print control apparatus according to the present invention.
Figure 14:
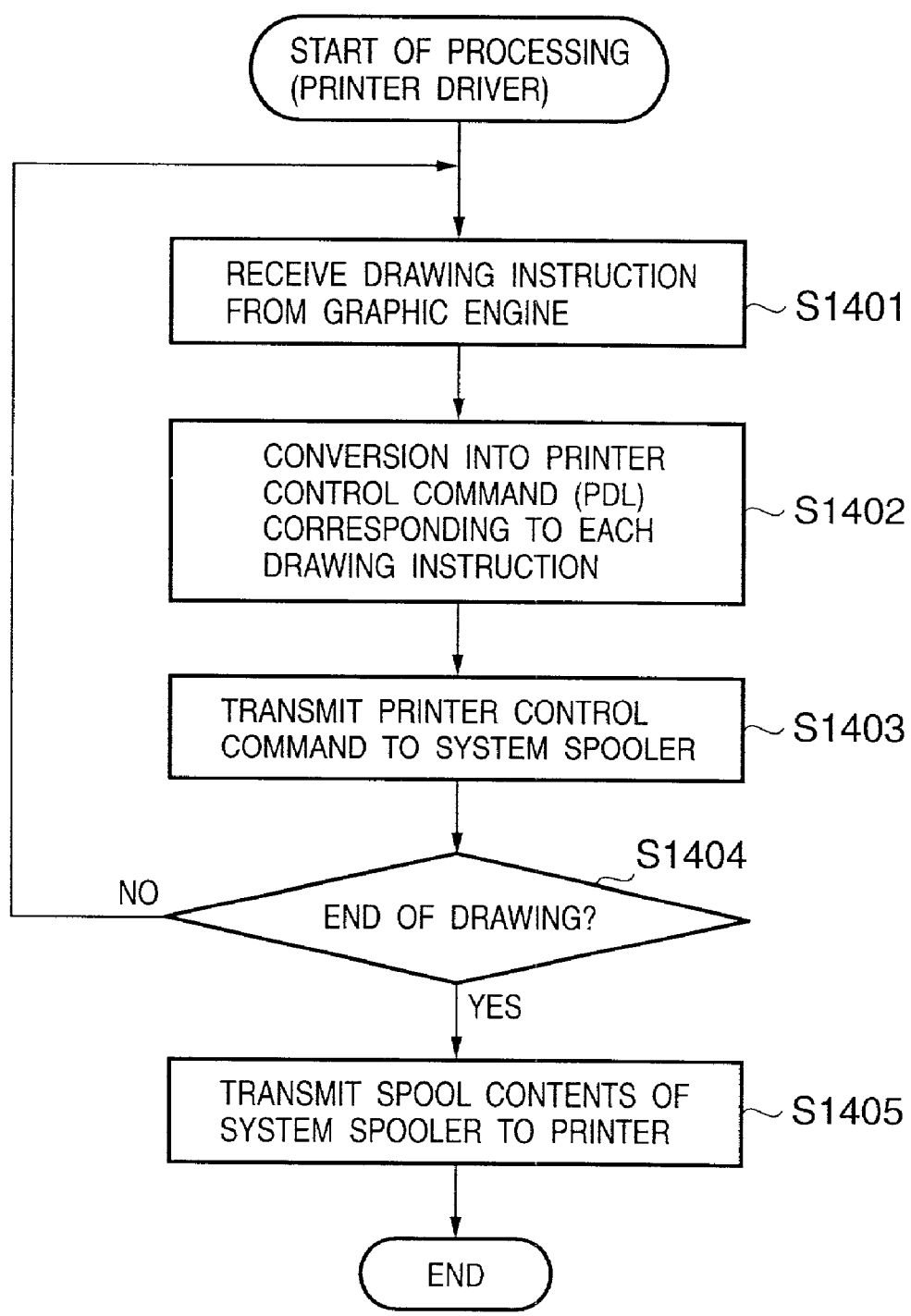
FIG. 14 is a flow chart showing the example of print data processing procedures in the print control apparatus according to the present invention.

In the processing flow of FIG. 13, drawing processing is done by the API call of the graphic engine. This processing is executed as another process. More specifically, the graphic engine is dynamically linked to the printer driver and executes print processing. The processing flow of the printer driver will be explained with reference to FIG. 14. FIG. 14 is a flow chart showing an example of print data processing procedures in the print control apparatus according to the present invention.

The printer driver 203 receives a drawing instruction from the application 201 via the graphic engine 202 (S1401), and generates a printer control (drawing) command data corresponding to each drawing instruction (e.g., line drawing) (S1402), and causes the system spooler 204 in the RAM 2 or external memory 11 to spool the printer control command data (S1403). The printer driver 203 checks whether drawing processing by the application 201 and graphic engine 202 ends (S1404). If NO in step S1404, the printer driver 203 returns to step S1401 and repeats the same processing.

If YES in step S1404, the printer driver 203 transmits to the printer 100 the printer control command data spooled by the system spooler 204 (S1405), and ends processing. The feature of the printer control command generation method (to be referred to as a vector graphics print mode hereinafter) executed by the printer driver 203 is that a printer control (drawing) command which provides a geometrical expression corresponding to vector graphics such as lines is transmitted to the printer 100 and the internal drawing processing system and program of the printer 100 generate (rasterize) a print image. In this case, the time taken for print processing in the printer 100 is decided by the type and number of objects.

In the image mode, the printer driver transmits image data received from the graphic engine, to the system spooler without converting the image data to PDL.

In this way, the print processing system according to the embodiment can decide a print mode based on print conditions designated by the user even when automatic setting is designated as a print mode. Cumbersome operation of analyzing spooled data and deciding a print mode can be eliminated depending on set print conditions, and the throughput of the entire print processing can increase. If no print mode can be decided based on print conditions designated by the user, a print mode is decided by analyzing spooled data. Thus, a print mode suitable for print data can be decided.

The host computer may comprise a plurality of image drivers, a plurality of different types of PDL drivers, or a mixture of pluralities of image drivers and PDL drivers.

Figure 15:
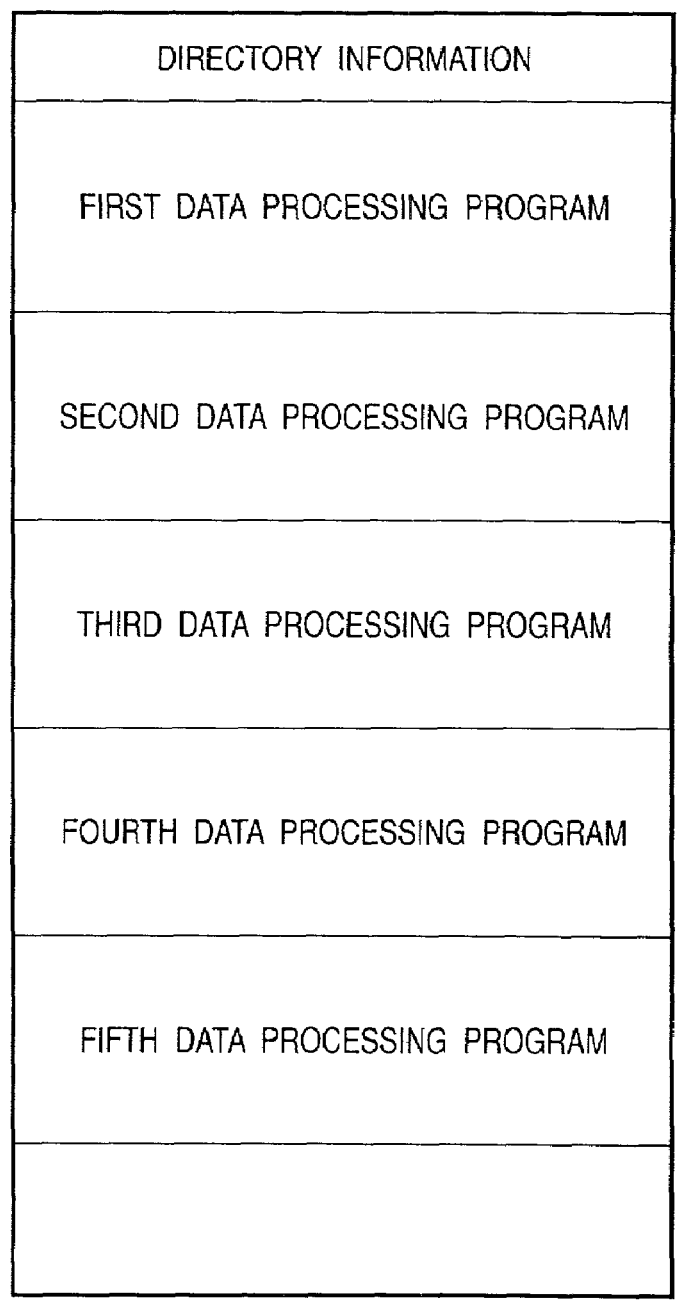
FIG. 15 is a view showing the memory map of a storage medium storing various data processing programs which can be read out by a print system to which the print control apparatus according to the present invention can be applied.

FIG. 15 is a view for explaining the memory map of a storage medium storing various data processing programs which can be read out by a print system to which the print control apparatus according to the present invention can be applied.

Although not shown, the storage medium may store information for managing programs stored in the storage medium, such as version information and user information, and information depending on the OS of a program readout side, such as an icon for identifiably displaying a program.

Data subordinate to various programs are also managed by the directory. When a program for installing various programs into a computer, and a program to be installed are compressed, a decompression program or the like may be stored.

Processes shown in FIGS. 7, 11, 12, 13, and 14 in this embodiment may be achieved by a host computer in accordance with an externally installed program. The present invention is applied even when pieces of information including a program are supplied to an output device from a storage medium such as a CD-ROM or flash memory or from an external storage medium via a network.

The object of the present invention is also achieved when a storage medium which stores software program codes for realizing the functions of the above-described embodiment is supplied to a system or apparatus, and the computer (or the CPU or MPU) of the system or apparatus reads out and executes the program codes stored in the storage medium.

In this case, the program codes read out from the storage medium realize new functions of the present invention, and the storage medium which stores the program codes constitutes the present invention. As a storage medium for supplying the program codes, a floppy disk, hard disk, optical disk, magnetooptical disk, DVD, CD-ROM, magnetic tape, nonvolatile memory card, ROM, EEPROM, or the like can be used.

The functions of the above-described embodiment are realized not only when the computer executes the readout program codes, but also when the OS (Operating System)

running on the computer performs part or all of actual processing on the basis of the instructions of the program codes. The functions of the above-described embodiment are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

<Effect of the Invention>

As has been described above, according to the present invention, a print control system capable of automatically setting a print mode and print conditions can automatically set a print mode within a short time. Moreover, this system can preferentially select a print mode which satisfies a function and condition designated by the user and perform print processing in the print mode.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus for generating print data for a print device having a plurality of print description modes, comprising:
    user interface means for causing a user to set a print setting item;
    first decision means for deciding one of the plurality of print description modes in accordance with the print setting item set via said user interface means;
    second decision means for deciding one of the plurality of print description modes in accordance with contents of print data to be printed; and
    generation means for generating print data to be printed by the print device in the print description mode decided by said first decision means or said second decision means,
    wherein a decision process of said second decision means is not performed when said first decision means does decide one print description mode, and the decision process of said second decision means is performed when said first decision means does not decide one print description mode.

2. The apparatus according to claim 1, further comprising transmission means for transmitting the print data generated by said generation means to the print device.

3. The apparatus according to claim 1, wherein
    prior to decision of a print description mode by said first and second decision means, said user interface means causes the user to select one of the plurality of print description modes or an automatic mode in which one of the plurality of print description modes is automatically decided, and
    said first and second decision means decide one print description mode when the automatic mode is selected.

4. The apparatus according to claim 1, wherein the item set via said user interface means includes an adjustment item for adjusting quality of an image to be printed.

5. The apparatus according to claim 4, wherein
    the plurality of print description modes include an image mode in which the print device receives and prints image data, and
    when the adjustment item is set via said user interface means, said first decision means decides the image mode as a print description mode.

6. The apparatus according to claim 1, wherein the item set via said user interface means includes an edit item for editing an image to be printed.

7. The apparatus according to claim 6, wherein the plurality of print description modes include a Page Description Language mode in which the print device receives a page description instruction, generates an image, and prints the image, and
    when the edit item is set via said user interface means, said first decision means decides the Page Description Language mode as a print description mode.

8. The apparatus according to claim 1, wherein said second decision means calculates data amounts of print data to be transmitted to the print device in an image and a Page Description Language mode, in which the print device receives a page description instruction and prints the image, and decides a mode exhibiting a small data amount as a print description mode.

9. A print control method of printing data by a print device having a plurality of print description modes, comprising:
    a first decision step of deciding one of the plurality of print description modes in accordance with a print setting item and value set by a user;
    a second decision step of deciding one of the plurality of print description modes in accordance with contents of print data to be printed; and
    a transmission step of transmitting print data to the print device in the print description mode decided in the first decision step,
    wherein said second decision step is not performed when said first decision step does decide one print description mode, and said second decision step is performed when said first decision step does not decide one print description mode.

10. The method according to 9, wherein in the first and second decision steps, a print description mode is decided when an automatic mode in which one of the plurality of print description modes is automatically decided is selected.

11. The method according to claim 9, wherein
    the plurality of print description modes include an image mode in which the print device receives and prints image data, and
    when an adjustment item for adjusting image quality is set, the image mode is decided as a print description mode in the first decision step.

12. The method according to claim 9, wherein the plurality of print description modes include a Page Description Language mode in which the print device receives a page description instruction, generates an image, and prints the image, and
    when an edit item for editing an image is set, the Page Description Language mode is set as a print description mode in the first decision step.

13. The method according to claim 9, wherein in the second decision step, data amounts of print data to be transmitted to the print device in an image and a Page Description Language mode, in which the print device receives a page description instruction and prints the image, are calculated, and a mode exhibiting a small data amount is decided as a print description mode.

14. A computer readable storage medium which stores a computer program for generating print data for a print device having a plurality of print description modes, the program comprising:

a user interface step of causing a user to set a print setting item;

a first decision step of deciding one of the plurality of print description modes in accordance with the print setting item set in the user interface step; and a second decision step of deciding one of the plurality of print description modes in accordance with contents of print data to be printed; and a generation step of generating print data to be printed by the print device in the print description mode decided in the first decision step, wherein said second decision step is not performed when said first decision step does decide one print description mode, and said second decision step is performed when said first decision means does not decide one print description mode.

15. The medium according to claim 14, wherein the storage medium comprises the transmission step of transmitting the print data generated in the generation step to the print device.

16. The medium according to claim 14, wherein in the user interface step, the user is caused to select one of the plurality of print description modes or an automatic mode in which one of the plurality of print description modes is automatically decided, prior to decision of a print description mode in the first and second decision steps, and in the first and second decision steps, one print description mode is decided when the automatic mode is selected.

17. The medium according to claim 14, wherein the item set in the user interface step includes an adjustment item for adjusting quality of an image to be printed.

18. The medium according to claim 17, wherein the plurality of print description modes include an image mode in which the print device receives and prints image data, and when the adjustment item is set in the user interface step, the image mode is decided as a print description mode in the first decision step.

19. The medium according to claim 14, wherein the item set in the user interface step includes an edit item for editing an image to be printed.

20. The medium according to claim 19, wherein the plurality of print description modes include a Page Description Lanauage mode in which the print device receives a page description instruction, generates an image, and prints the image, and when the edit item is set in the user interface step, the Page Description Language mode is decided as a print description mode in the first decision step.

21. The medium according to claim 14, wherein in the second decision step, data amounts of print data to be transmitted to the print device in an image and a Page Description Language mode, in which the print device receives a page description instruction and prints the image, modes are calculated, and a mode exhibiting a small data amount is decided as a print description mode.

22. A computer program stored on a computer readable medium and executed by a host computer for generating print data for a print device having a plurality of print description modes, comprising:

a user interface step of causing a user to set a print setting item;

a first decision step of deciding one of the plurality of print description modes in accordance with the print setting item set in the user interface step; and a second decision step of deciding one of the plurality of print description modes in accordance with contents of print data to be printed; and a generation step of generating print data to be printed by the print device in the print description mode decided in the first decision step, wherein said second decision step is not performed when said first decision step does decide one print description mode, and said second decision step is performed when said first decision step does not decide one print description mode.

23. The program according to claim 22, further comprising a transmission step of transmitting the print data generated in the generation step to the print device.

24. The program according to claim 22, wherein in the user interface step, the user is caused to select one of the plurality of print description modes or an automatic mode in which one of the plurality of print description modes is automatically decided, prior to decision of a print description mode in the first and second decision steps, and in the first and second decision steps, one print description mode is decided when the automatic mode is selected.

25. The program according to claim 22, wherein the item set in the user interface step includes an adjustment item for adjusting quality of an image to be printed.

26. The program according to claim 25, wherein the plurality of print description modes include an image mode in which the print device receives and prints image data, and when the adjustment item is set in the user interface step, the image mode is decided as a print description mode in the first decision step.

27. The program according to claim 22, wherein the item set in the user interface step includes an edit item for editing an image to be printed.

28. The program according to claim 27, wherein the plurality of print description modes include a Page Description Language mode in which the print device receives a page description instruction, generates an image, and prints the image, and when the edit item is set in the user interface step, the Page Description Language mode is decided as a print description mode in the first decision step.

29. The program according to claim 22, wherein in the second decision step, data amounts of print data to be transmitted to the print device in an image and a Page Description Language mode, in which the print device receives a page description instruction and prints the image, are calculated, and a mode exhibiting a small data amount is decided as a print description mode.

30. A print control apparatus for generating print data for a print device having a plurality of print description modes, comprising:

a user interface for causing a user to set a print setting item;

a printer driver for deciding a print description mode when one print description mode can be decided based on the item set via said user interface; and a despooler for deciding despooling spooled print data and deciding a print description mode in accordance with contents of the print data, wherein a decision process of said despooler is not performed when said printer driver does decide one print description mode, and the decision process of said despooler is performed when said printer driver does not decide one print description mode.

31. The apparatus according to claim 30, wherein said printer driver and said despooler generate print data in different print description modes.

32. The apparatus according to claim 30, wherein prior to decision of a print description mode by said printer driver and said despooler, said user interface causes the user to select one of the plurality of print description modes or an automatic mode in which a print description mode is automatically decided, and said printer driver and said despooler decide a print description mode when the automatic mode is selected.

33. The apparatus according to claim 30, wherein said user interface includes as the item set by the user an adjustment item for adjusting quality of an image to be printed, and an edit item for editing an image to be printed, and when the adjustment item is set, said printer driver decides as a print description mode an image mode in which the print device receives and prints image data, and when the edit item is set, decides as a print description mode a Page Description Language mode in which the print device receives a page description instruction and prints an image.

34. The apparatus according to claim 30, wherein said despooler calculates data amounts of print data to be transmitted to the print device in both an image mode in which the print device receives and prints image data and a Page Description Language mode, in which the print device receives a page description instruction and prints an image, and decides a mode exhibiting a small data amount as a print description mode.

* * * * *